United States Patent [19]

Garoutte

[11] Patent Number: 4,803,135
[45] Date of Patent: Feb. 7, 1989

[54] PRESSURE ACTIVATED RESERVE BATTERY

[75] Inventor: Kurt F. Garoutte, Furlong, Pa.

[73] Assignee: Honeywell Inc., Minneapolis, Minn.

[21] Appl. No.: 161,556

[22] Filed: Feb. 29, 1988

[51] Int. Cl.$^4$ ............................................. H01M 6/34
[52] U.S. Cl. .................................. 429/116; 429/119
[58] Field of Search ............... 429/116, 119, 110, 118

[56] References Cited

U.S. PATENT DOCUMENTS

| | | | |
|---|---|---|---|
| 4,012,234 | 3/1977 | Kraft | 429/119 X |
| 4,087,590 | 5/1978 | Kraft | 429/119 X |

Primary Examiner—Anthony Skapars
Attorney, Agent, or Firm—Mitchell J. Halista; Charles G. Mersereau; Albin Medved

[57] ABSTRACT

A pressure activated reserve battery, capable of being activated by increasing external or environmental seawater pressure as the device is lowered or sinks to depth, without benefit of an external pressure hull. Pressure compensation, balancing of external seawater pressure and internal electrolyte pressures continually after activation of the device precludes the use of a pressure hull. A pressure activated battery, made up of reserve cells, for selectively providing stored reserve electrolyte into cell electrode environments upon application of a specified activation pressure. Each cylindrical reserve cell housing includes an electrolyte reservoir and a cell electrode assembly. A first barrier having a pressure rupturable disc is arranged to provide a fluid-tight separation between the electrode assembly and the electrolyte reservoir. A collapsing cup integrally attached to the wall of the electrolyte reservoir is located within the reservoir with the open end adjacent to and facing the first pressure rupturable barrier. A second pressure rupturable barrier is located on the external end of the cylindrical electrolyte reservoir. The reserve cell assemblies are located within an external housing filled with an electrically non-conductive fluid having a first end cover containing a third pressure rupturable disc. A flexible bladder is provided within the external housing to isolate the fill fluid from the end cover and the third rupturable disc. The application of a predetermined external pressure on the housing results in an initial collapse of the third rupturable disc and a subsequent application of the external pressure to the bladder to pressurize the fill fluid. The pressurization of the fill fluid to a predetermined level results in a rupture of the second rupturable disc and the pressurization of the electrolyte by a collapse of the integral cup. Finally, the pressurized electrolyte is effective to breach the first rupturable disc to enable the electrolyte to be forced into the electrode assembly to wet the electrodes to activate the battery.

7 Claims, 1 Drawing Sheet

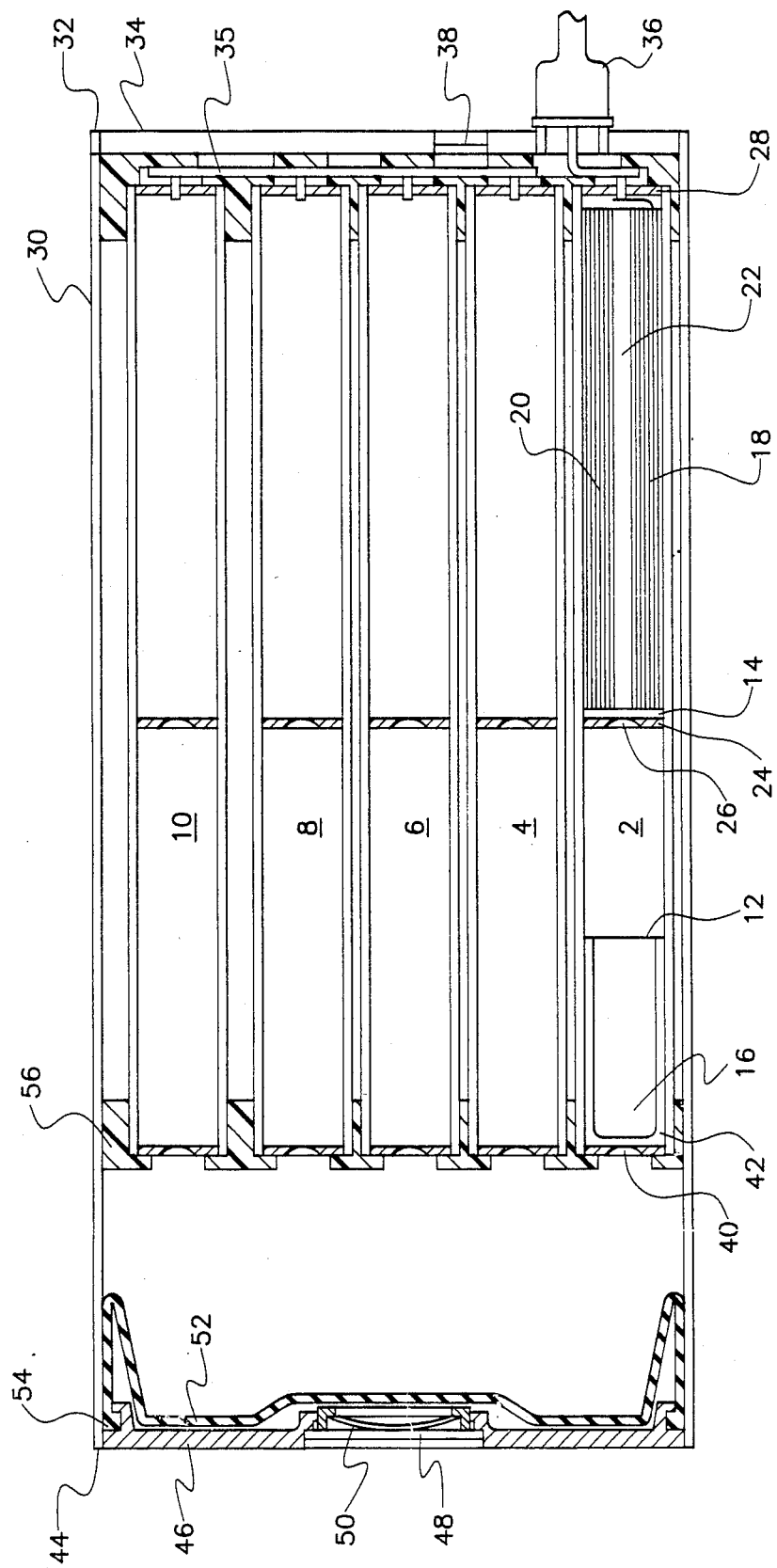

PRESSURE ACTIVATED RESERVE BATTERY

BACKGROUND OF THE INVENTION

1. Field of the Invention

The present invention relates to reserve electrochemical cells. More specifically, the present invention is directed to an improved reserve electrochemical cell for selectively and automatically releasing a stored electrolyte into a electrode environment of a battery.

SUMMARY OF THE INVENTION

An object of the present invention is to provide an improved reserve battery for storing an electrolyte and automatically releasing the stored electrolyte into a working electrode environment as a result of the application of an external pressure on the battery, precluding the use of a pressure hull for deep submergence applications.

In accomplishing this and other objects, there has been provided, in accordance with the present invention a reserve battery including a first container means for storing a pair of battery electrodes, a second container means for storing a battery electrolyte, a first rupturable seal means arranged to provide a rupturable fluid-tight barrier between the first and second containers, a second rupturable seal means across an opening in the second container means, a deformable cup means located within the second container and having a closed end facing the second seal means and an open end facing the first seal means and having a cup wall formed integrally with a wall of the second container means, a housing containing the first and second container means having an opening therein, an electrically nonconductive fill fluid with the housing means in contact with the second seal means, a third rupturable means across the opening in the housing and a flexible bladder isolating the third rupturable means from the fill fluid.

BRIEF DESCRIPTION OF THE DRAWING

A better understanding of the present invention may be had when the following detailed description is read in connection with the accompanying drawing in which the single FIGURE is a cross-sectional illustration of an embodiment of a reserve battery of the present invention in an inactivated fluid storing state.

DESCRIPTION OF THE EMBODIMENT

Referring to FIG. 1 in more detail, there is shown a reserve battery in an inactivated or electrolyte storing state including a plurality of battery cells 2, 4, 6, 8 and 10. Each battery cell has a common construction and the following description is directed to a typical battery cell, e.g., cell 2. Cell 2 includes a tubular shell 12 divided into a first compartment or container 14 and a second compartment or container 16. The first compartment 14 is arranged to house a pair of battery electrodes 18, 20. In a preferred embodiment, the electrodes 18, 20 are laminated on each side of an appropriate separator material and then spirally wrapped. The second container 16 is arranged to provide a storage for a battery electrolyte and is isolated from the first container 14 by a barrier 24 containing a first pressure rupturable disc 26, e.g., a metallic element having a thickness of 0.005 inches. The barrier 24 is sealed to the inner wall of the shell 12 to isolate the electrolyte from the battery electrodes during an inactive state of the battery cell.

A first open end of the shell 12 adjacent to the container 16 containing the battery electrodes 18, 20 is sealed with an end cap 28 to provide a fluid-tight seal thereacross. The end cap 28 is provided with nonconductive means, e.g., glass-to-metal seals, for allowing a passage therethrough of electrical conductors arranged to provide electrical connections to the battery electrodes 18, 20. The battery cells 2 to 10 are, in turn, located within a housing 30 having a first open end 32 adjacent to the ends of the cells 2 to 10 containing the battery electrodes. The open end 32 is provided with a fluid-tight bulkhead 34 to provide a fluid-tight seal thereacross. Additional electrical wiring 35 between the cells 2 to 10 is located within the housing 30 between the cells 2 to 10 and the bulkhead 34. An electrical connection to the cell wiring 35 is provided by a battery connector 36 through the bulkhead 34 through a suitable fluid-tight access. A battery vent 38 is also located in the bulkhead 34 to provide a venting of excess pressure from within the housing 30.

A second open end of the shell 12, i.e., an open end of the second container 16, is sealed by a barrier containing a second rupturable disc 40 located thereacross which may be similar to the first disc 26. The second rupturable disc 40 as well as the first disc 26 may comprise all or part of the barrier across the open ends of the second container 16 to provide a fluid-tight seal of the electrolyte within the second compartment 16. A cup 42 is located within the second compartment 16 and is formed integrally with the wall of the shell 12 to provide a fluid-tight seal therewith. A closed end of the cup 42 is positioned adjacent to the second disc 40 while the open end of the cup 42 is arranged to face the first barrier 26. A second open end 44 of the shell 30 is sealed by a second bulkhead 46 which is spaced from the second disc 40. The bulkhead 46 is arranged to support a third rupturable disc 48, which may be similar to the discs 26 and 40, therein which has one side exposed to an environment external to the shell 30 and the second side exposed to an internal volume of the shell 30. The third rupturable disc 48 is also preferably shielded from a direct exposure to the internal volume of the shell 30 by a porous baffle 50 located across the third disc 48 and retained on the bulkhead 46.

A flexible bladder 52, e.g., rubber, is positioned across the opened end 44 of the shell 30 and has its peripheral edge 54 attached to the inner wall of the shell 30 by the bulkhead 46 to provide a fluid-tight seal therewith. The bladder 52 is arranged to isolate the third rupturable seal and the baffle 50 from the second disc 40 of the cells and the internal volume of the shell 30. An electrically nonconductive fill fluid, e.g., silicone oil, is used to fill the space between the bladder 52 and the cells 2 to 10 as well as the remaining internal volume of the shell 30 surrounding the cells 2 to 10. A potting compound 56 is provided within the shell 30 to structurally separate the cells 2 to 10 and to provide a mechanical support for the cells 2 to 10.

An activation of the battery shown in the FIGURE is achieved by the application of an external pressure to the housing 30, e.g., via a pressurized external fluid, which is sufficient to rupture the first rupturable disc 48. This allows the external pressure to be applied to the bladder 52 to pressurize the fill fluid within the shell 30. The baffle 50 is effective to shield the bladder 52 from damage by the inwardly directed edges of the ruptured first disc 48 to prevent a contamination of the fill fluid by the external pressure medium. Upon the attainment of a sufficient internal pressure of the fill fluid, the second rupturable disc of each of the cells 2 to 10 is breached, and the fluid pressure exerted by the fill fluid is applied to the cup 42. A resulting collapse of the cup 42 under the pressure applied thereto by the fill fluid is effective to pressurize the electrolyte within the electrolyte container 16 to ultimately rupture the first rupturable disc 26 and drive the electrolyte from the electrolyte container 16 into the battery electrode compartment 14 to wet the electrodes 18,20. Thus, the electrolyte is released into the electrode compartment 14 to activate the battery to provide electrical power to associated electrical equipment via the electrical connector 36.

In summary, this reserve battery contains reserve cells activated by the increasing pressure of seawater as the device is lowered or sinks to depth. In order to preclude the use of a pressure hull, the pressure is transmitted to a non-conductive fluid within the device. This non-conductive fluid is pressurized through the use of a flexible member such as a rubber bladder. The movement of this flexible member allows the internal oil pressure and the external seawater pressure to always be maintained in equilibrium and hence the need for the external battery shell to be pressure resistant is avoided.

The reserve cells contain a liquid electrolyte housed in yet another flexible or collapsible container, which when activated upon by the oil pressure causes the pressure to be transmitted to the electrolyte. This electrolyte pressure acts upon a frangible or rupturable diaphragm causing it to fail, thus allowing the oil pressure to force the electrolyte into the cell.

Once the cell is activated all three liquid pressures (seawater, oil and electrolyte) come to equilibrium. This insures that the pressure remains equalized on all surfaces, both internal and external to the individual cells and battery case. The succession of seals including the rubber bladder, mass of oil and the movable component forming the cell electrolyte reservoir prevent any possible contact between the conductive seawater and the cell electrochemistry. Thus electrical isolation is assured.

This invention has significant advantages, as follows:
1. The unit is seawater activated. The energy to initiate each of the cells comes from the seawater pressure at prescribed depths. This avoids the costly use of pressure generating devices that can only increase the overall complexity of the unit and therefore have negative impact on its reliability and cost.
2. The unit is pressure tolerant. This means that once activation is achieved, a liquid-to-liquid hydraulic condition exists throughout the unit—all pressures are equalized to the outer seawater pressure because of the direct interface with it and no high pressure differentials across structural components exist. This permits low weight by minimizing pressure bulkhead and hull thickness requirements.
3. The unit uses individual cells. Separate, physically independent cells are used in the battery design. This has several major benefits:
   A. Intercell leakage which can lead to performance loss, excess heating, dendritic growth and then shorting, post discharge instability and therefore safety concerns is totally eliminated.
   B. With each cell/reservoir containing its own, unshared, close by supply of electrolyte, there is no need for complex electrolyte distribution systems, tubes, channels, and so on. The liquid is simply forced through a single orifice by pressure supplied by the surrounding ambient condition. There is no change of uneven fill, electrical leakage through common electrolyte paths or need for expensive, common reservoir type components, e.g., bellows.
   C. Each cell can be individually checked for good quality before its commitment to a battery assembly, and more importantly, the battery assembly process has a negligible possibility of changing the initial quality of the cell.
   D. The unit is minimally complex and the design concept lends itself to inherent safety advantages in terms of thermal management, design and placement of safety vents and their functional requirements under abusive conditions. The individual cell reservoirs and the rubber bladder itself can both expand back toward their preactivation condition should internal pressure begin to rise to provide a internal volume that will attenuate the rate of the internal pressure rise and in some less than severe abuse conditions contain it.

Accordingly, it may be seen, there has been provided, in accordance with the present invention an improved reserve battery.

The embodiments of the present invention in which an exclusive property or privilege is claimed are defined as follows:

1. A reserve pressure compensating battery comprising at least one reserve cell which contains a means for storing a pair of cell electrodes and an electrolyte reservoir, separated by a fluid-tight barrier,
   a first rupturable seal means for providing a rupturable fluid-tight barrier between the cell electrodes and the cell electrolyte reservoir, said barrier being arranged to connect the cell electrodes and the cell electrolyte reservoir through an appropriate opening,
   a second rupturable seal means across an external end of the cell electrolyte reservoir means,
   a deformable cup means within the electrolyte reservoir means, having the closed cup end facing said second rupturable seal means and an open end facing first seal means with a wall of said cup being integrally attached to the outer reservoir and cell wall means to provide a fluid-tight seal therewith,
   a housing means surrounding said reserve cell and having an opening therein,
   a third rupturable seal means across said opening in said housing means,
   a flexible bladder means in said housing means for isolating said third seal means from said second seal means and
   an electrically nonconductive fill fluid within said housing means between said bladder means and said second seal means whereby a movement of said bladder means allows an internal pressure of said fill fluid to match an external environmental pressure to minimize pressure resistance of said housing means.

2. A battery as set forth in claim 1 wherein said first and second container means include respective adjacent portions of a single shell.

3. A battery as set forth in claim 1 wherein said first and second seal means each include a rupturable disc arranged to be breached at a predetermined applied pressure.

4. A battery as set forth in claim 1 wherein said first, second and third seal means each include a rupturable disc arranged to be breached at a predetermined applied pressure.

5. A battery as set forth in claim 4 wherein said third seal means includes a porous baffle arranged to shield said disc in said third seal means from said bladder means.

6. A battery as set forth in claim 1 wherein said third seal mean includes means for sealing a peripheral edge of said bladder means to said housing means.

7. A battery as set forth in claim 1 wherein said bladder means includes a rubber sheet and said fill fluid is silicone oil.

* * * * *